3,080,522
DIRECT READING TIME-INTERVAL MEASURING SET
Milton L. Embree, Laureldale, and Liber J. Montone, Reading, Pa.; said Embree assignor to Bell Telephone Laboratories, Incorporated, New York, N.Y., a corporation of New York, said Montone assignor to Western Electric Company, Incorporated, New York, N.Y., a corporation of New York
Filed Nov. 1, 1960, Ser. No. 66,472
20 Claims. (Cl. 324—158)

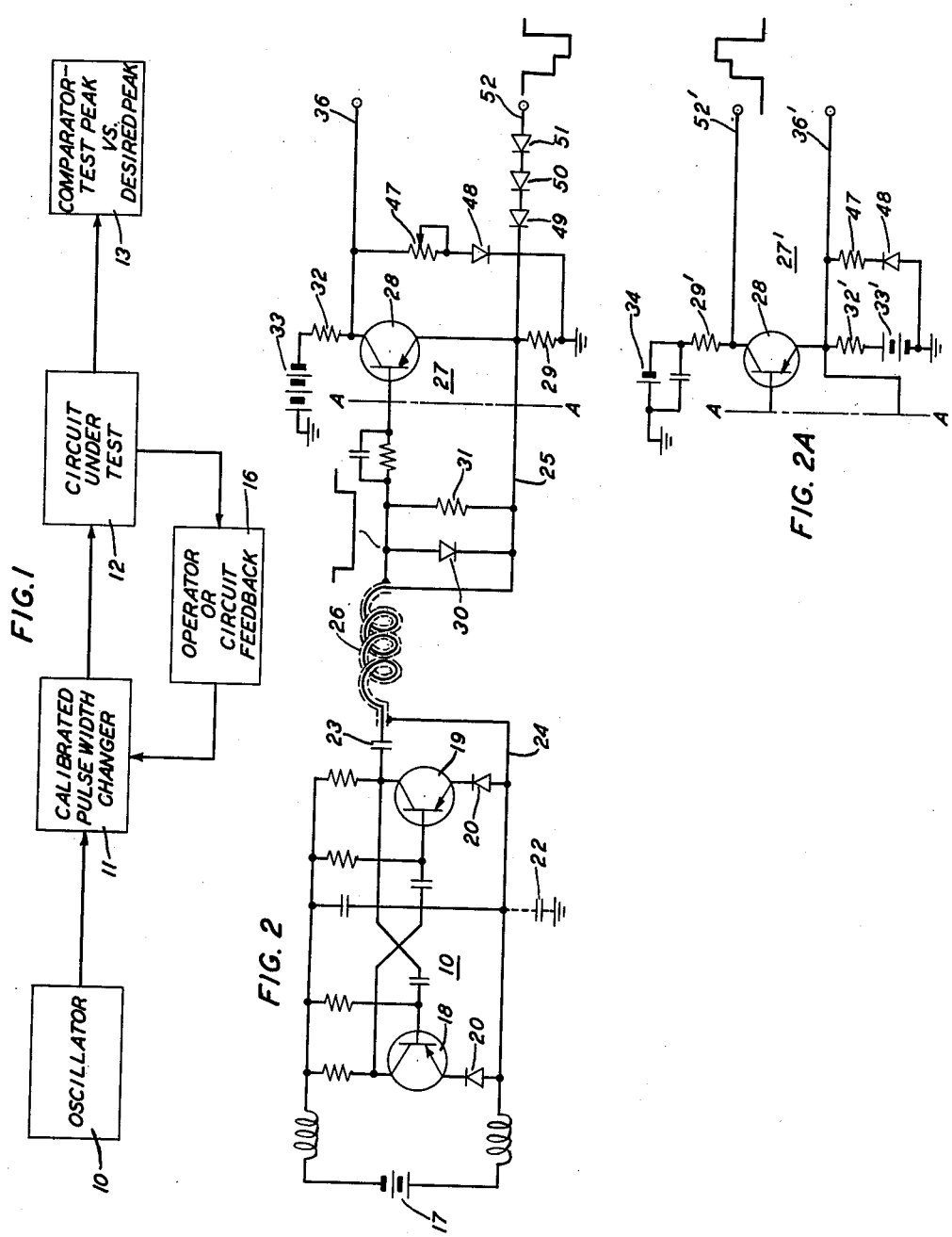

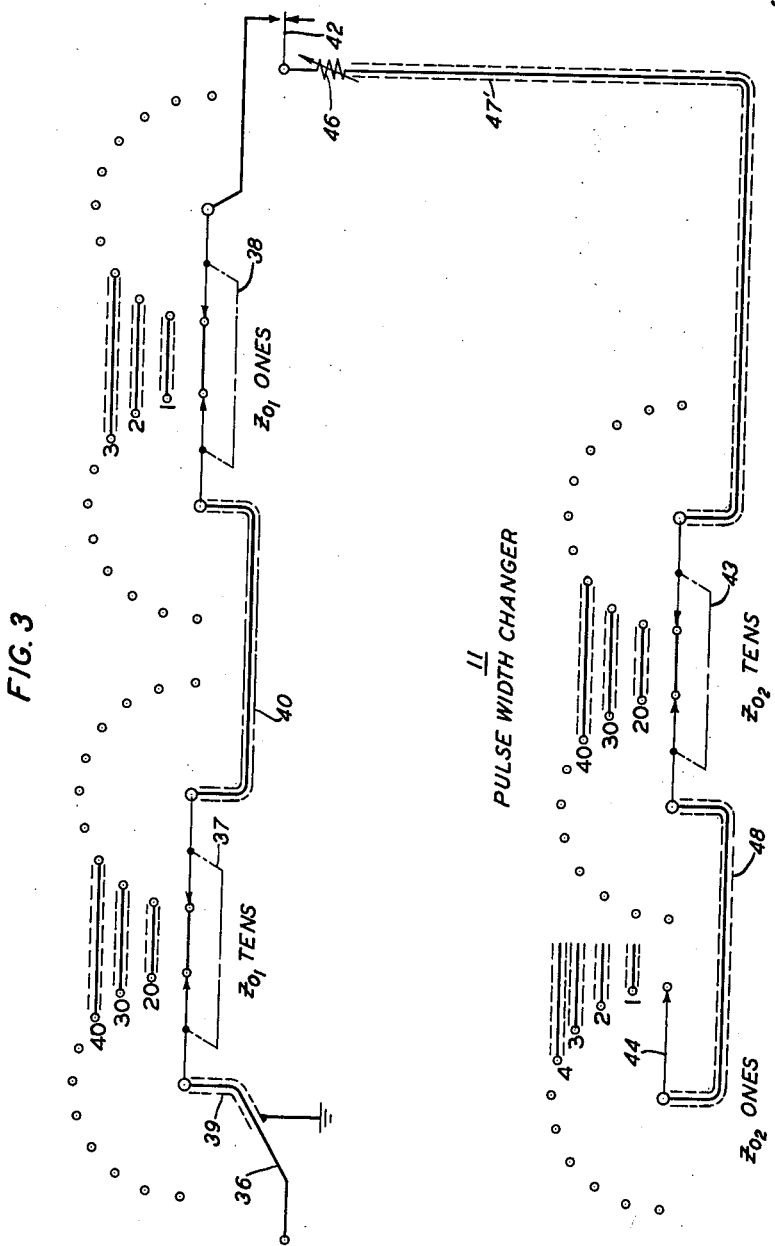

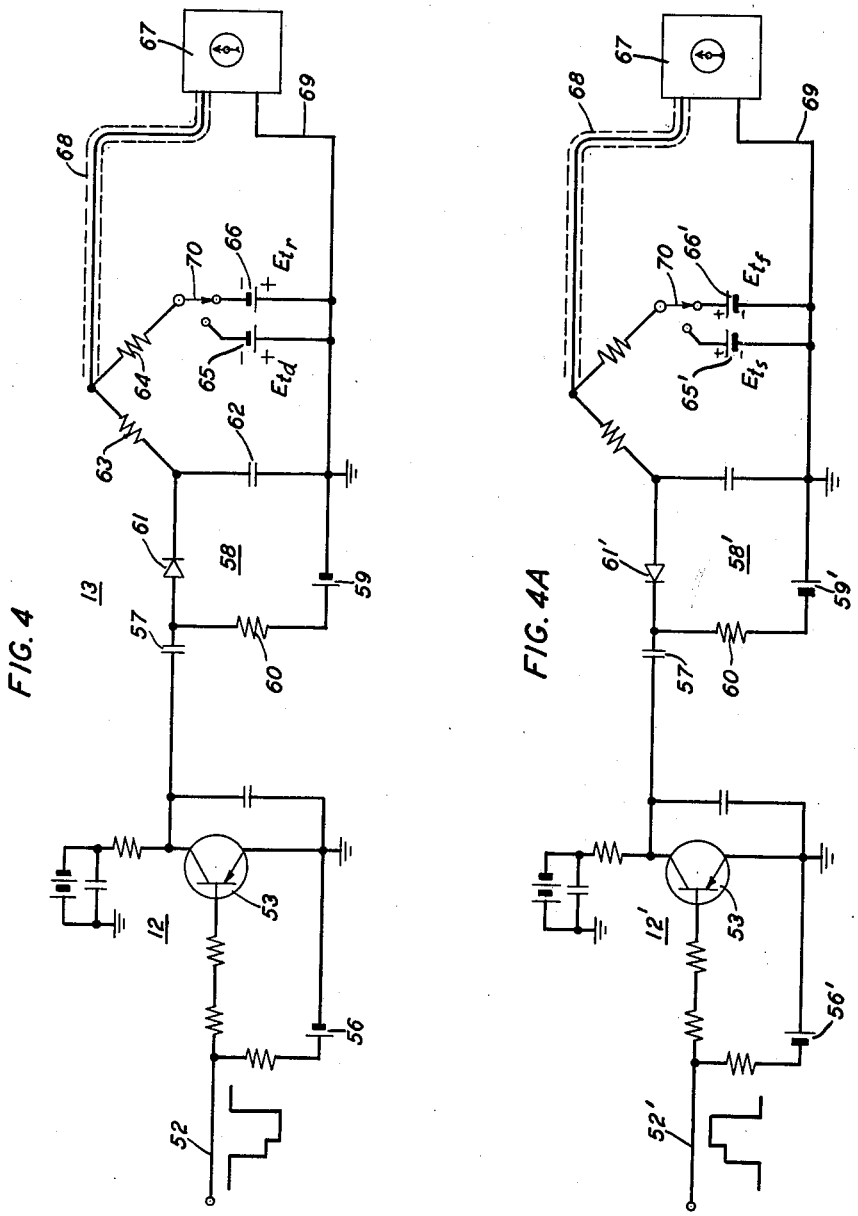

This invention relates to a time-interval measuring system. More particularly, the invention relates to such a system wherein the interval duration is a known function of the duration of a drive which produces an operation defining the interval.

It frequently happens that the commercial requirements for a switching device dictate operating time limits which fall relatively close to the average in a Gaussian distribution of operating times for such devices as manufactured. In such a situation the production testing techniques must be capable of extreme precision in order to discriminate between devices which fall within the specification limits and devices which fall outside of such limits. Absent such precision it is necessary to establish a measuring safety factor in order to be certain that all devices which are indicated by the test equipment to be acceptable are actually operating within specification limits. The size of the safety factor is determined by the accuracy of the test equipment. The use of a safety factor in the manner described usually involves a substantial financial loss for the manufacturer since many devices actually having operating times which fall into the doubtful region represented by the safety factor must be rejected because the existence of that actuality cannot be determined with certainty.

One typical situation where the conflict between specification limits and device operating time distribution is encountered is in the measurement of delay times and rise times for transistors that are to be used in computer systems. Delay time is usually defined as the time required for a transistor output voltage to rise to 10 percent of its full output voltage swing after it has received a turn-on instruction. The time required for the output voltage to increase from the 10 percent level to the 90 percent level is usually designated the rise time.

The most widely used method in the industry for determining switching time intervals for devices is the conventional oscilloscope method. In this method the output voltage of a device which operates to define the interval to be measured is compared to an active time reference such as the oscilloscope sweep voltage wave. The device under test is instructed to switch by a pulse from a pulse generator. This instruction simultaneously triggers the sweep of an oscilloscope display which indicates the start of time measurement. An operator visually estimates the end of time measurement at a particular percentage of the output voltage excursion for the device under test. Time is interpreted as a function of distance on the X axis of the display. While reasonably accurate measurements can be made in a laboratory with this method, its use on production lines is costly, inaccurate, and time consuming.

Accordingly, it is an object of this invention to increase the accuracy of switching time measuring systems and to improve the repeatability thereof.

Another object is to improve the stability of time-interval measuring systems in the presence of variable operating conditions and component characteristics.

An additional object is to reduce the cost of manufacturing operations which are dependent upon time-interval measurements for efficient production.

Further objects are to change time-interval measuring techniques so that accurate measurements may be easily made with reduced cost and increased speed as compared to currently known measuring techniques.

These and other objects of the invention are realized in an illustrative embodiment in a circuit for measuring delay and rise times for transistors. It has been found that if a transistor is biased On by a pulse which is shorter than the total switching time of the transistor two things occur:

(1) The transistor circuit peak output voltage occurs at the exact time of drive pulse termination, and (2) The drive pulse duration is equal to the time required by the transistor to attain such peak.

To take advantage of these two circumstances, an oscillator output is coupled to the input of a transistor switch in an emitter follower circuit to bias the transistor On and Off. An open circuited coaxial cable of calibrated, adjustable length and characteristic impedance has the input thereof connected so that cable capacitance may be charged and discharged by the switch action to generate pulses in the emitter follower load resistor. The duration of each pulse is exactly equal to the round trip propagation time of the in-circuit cable portion.

A circuit under test including, for example, a transistor, is partially swtiched by such pulses from the load resistor, and the test transistor peak output potential for partial switching is compared to a known voltage representing a portion of the full output voltage transient swing for such a test transistor. By proper adjustment of cable length, the test transistor peak output voltage can be made equal to the known voltage. When such equality has been attained, it is known that the pulse propagation time represented by the in-circuit cable portion is equal to the time required for the test transistor to switch through its selected transient portion. The cable characteristic impedance may be varied in such a way as to compensate automatically for any tendency of the test transistor drive current to change as the transistor begins to switch.

It is one feature of the invention that the circuitry therefor is relatively simple compared to prior art circuits. Additional features are that separate, direct, digital readouts for transistor delay time and rise time may be provided. The use of a passive time standard, such as coaxial cable, renders the time measuring circuit relatively free from variations in operating temperature, line voltage, and component drift.

All of these features contribute to substantially improved accuracy and repeatability for the circuits to be described. Thus, in one embodiment it was found that measurements could be made with a repeatability of ±0.2 milli-microsecond whereas the best known prior art devices were capable of a repeatability of no better than ±3 milli-microseconds for similar measurements. In like manner the mentioned embodiment displayed an accuracy of ±½ a milli-microsecond for time intervals of about 10 milli-microseconds and an accuracy of ±1 milli-microsecond for measurements in the range of 100 milli-microseconds. The accuracy of the best prior art circuits for similar measurements was only ±7 percent and ±5 milli-microseconds, taken additively, for similar measurements.

A better understanding of the invention, as well as suggestions of additional features and objects thereof, may be obtained upon a consideration of the following detailed description, including the appended claims, taken in connection with the attached drawings in which:

FIG. 1 is a simplified block and line diagram illustrating the overall arrangement and operation of the invention;

FIGS. 2, 3, and 4 are schematic diagrams of portions of the measuring system of the invention; and FIGS. 2A and 4A are partial schematic diagrams of a modified form of the invention.

In FIG. 1 an oscillator 10 produces a train of pulses and a calibrated pulse width changer 11 varies the width of those pulses in a predetermined manner. In accordance with the invention the width changer comprises a plurality of sections of coaxial cable cut to different predetermined lengths which are selectively switched into the test circuit in a manner to be described. Output pulses from the width changer 11 are applied to a circuit 12 which includes the switching device under test, and the output of the test device is applied to a comparator circuit 13 wherein the peak value of the test device output potential is compared to a known voltage. A feedback path 16 provides for adjusting the setting of the pulse width changer as necessary to cause the test device output potential to be equal to the known reference voltage. This feedback may be accomplished by a human operator or by one of the many well known electromechanical feedback arrangements.

In the schematic diagram of FIG. 2 the oscillator 10 takes the form of a free-running transistor multivibrator which has an individual battery 17 for supplying operating potential to permit the multivibrator to be operated off ground. Transistors 18 and 19 are cross-coupled in a conventional Eccles-Jordan type of circuit with back-up diodes 20 connected in series with the emitter electrodes thereof to increase the base-emitter diode resistances of the transistors in a well known manner. A stray capacity 22 exists between ground and a reference voltage bus 24 of the multivibrator circuit. This multivibrator employs PNP transistors which are characterized by fast switching times and, therefore, is capable of producing an output pulse with an extremely short rise time on the leading edge thereof. In one multivibrator of this type arranged for a pulse repetition frequency of 100 kilocycles per second, the rise time for the pulses was found to be less than 4 milli-microseconds.

A capacitor 23 couples the varying output of multivibrator 10 at the collector electrode of transistor 19 to the input of an inverting transformer 26 which is capable of coupling the relatively long sharp pulses from multivibrator 10 to the input of a transistor switch circut 27 with reversed polarity and with substantially no deterioration of the pulses. Circuit 27 has an emitter follower configuration with a reference bus 25 in the input circuit and a ground reference for the output.

Transformer 26 is actually a length of coaxial cable wound on a ferrite toroid. It will be noted that each conductor of the cable cross-connects a voltage reference lead of one of the circuits to which it is connected to a voltage varying lead of the other one of the circuits. Such an arrangement makes it possible to couple the pulses as previously noted while at the same time effectively isolating multivibrator 10 from switch circuit 27 so that stray capacitor 22 cannot complete a shunt path for diverting the input pulses away from a transistor 28 in switch circuit 27 and through an emitter follower load resistor 29.

The arrangement described for floating multivibrator 10 and utilizing inverting transformer 26 was required in order that transistor 28 might be connected in an emitter follower configuration without the necessity for driving the circuit through its own load resistor 29. Diode 30 and resistor 31 are connected in shunt in the input to transistor switch circuit 27 to provide direct-current restoration in a well known manner. Transistor 28 is normally nonconducting in the absence of input pulses applied between its base and emitter electrodes from multivibrator 10.

The emitter follower circuit for switch 27 is completed by a collector circuit resistor 32 and a battery 33 which provides operating potential to transistor 28. Resistor 32 generally has a much larger resistance than does resistor 29 for the particular application to be described.

The collector electrode of transistor 28 is coupled through a lead 36 to the input end of a coaxial cable pulse width changer 11 illustrated in FIG. 3. This cable comprises essentially an open circuited transmission line in which the cable center conductor is connected to lead 36 and the outer conductor of the cable is grounded. The effective length of a first portion of the cable 11 may be changed by the operation of the tens selector switch 37 and the ones selector switch 38. The cable portion controlled by switches 37 and 38 has a first characteristic impedance $Z_{01}$. In the position illustrated switch 37 connects cable sections 39 and 40 in series with lead 36 to constitute the minimum cable length having a round trip propagation time of 10 milli-microseconds. Operation of switch 37 to its various positions increases the effective length of the cable by adding in series increasingly longer cable sections. The added sections are precut so that each step for switch 37 adds an additional 10 milli-microseconds of round trip propagation time to the cable. In order to preserve the simplicity of the drawing, only a few of the additional cable sections are illustrated in FIG. 3.

The operation of switch 38 inserts additional cable lengths to increase the effective round trip propagation time of in-circuit portions of the cable by one milli-second at each step.

A switch 42 is provided for adding other cable sections having a second characteristic impedance $Z_{02}$ in digital steps of tens and ones by the further operation of selector switches 43 and 44. Dials on switches 37, 38, 43, and 44 are marked to indicate the propagation time of in-circuit portions of the cable. A resistor 46 is shown in series with cable section 47 between switches 42 and 43. The purpose of resistor 46 and of the additional cable sections with the $Z_{02}$ characteristic impedance will be subsequently explained.

The distributed capacitance of the in-circuit portions of cable 11 is charged through resistor 32 from battery 33 when transistor 28 is biased Off. A limiter circuit connected between lead 36 and ground includes a rheostat 47 and a voltage limiter diode 48 limiting on its reverse breakdown characteristic. This limiter restricts the maximum charge potential attainable on the cable to a voltage level which is much less than the level otherwise attainable on the cable in the described circuit. The limiter is employed to protect transistor 28 since battery 33 has a terminal voltage which is adequate to charge the cable to a much larger voltage than is required in order to assure a fast charge rate to the desired test voltage. By thus restricting the maximum cable charge, the maximum frequency at which the cable can be charged and discharged is correspondingly increased.

Upon the application of a pulse between the base and emitter electrodes of transistor 28, conduction through the collector-emitter circuit thereof begins and the potential at lead 36 immediately increases to a negative value with respect to ground, which value is a function of the relative magnitudes of resistor 29 and the cable impedance presented between lead 36 and ground. This step change in the voltage at lead 36 causes the cable capacity to discharge through transistor 28 and resistor 29, and the discharge continues at a substantially uniform level for the period of time required for the mentioned step voltage change at lead 36 to be propagated through the effective length of cable in width changer 11, reflected from the open circuited end thereof, and returned to lead 36. The cable is now completely discharged and the potential difference across resistor 29 drops to a relatively small value dictated primarily by the relative magnitudes of resistors 29 and 32 and by the terminal voltage of battery 33.

Potentials developed across resistor 29 are coupled through clipping diodes 49, 50, and 51, and lead 52 to the test circuit 12 in FIG. 4. Circuit 12 may be any "black box" arrangement in which:

(a) The circuit output voltage peak occurs at a time which has a known relationship with respect to the time of drive pulse termination, and (b) The drive pulse duration has a known relationship to the time required by the test circuit output voltage to attain such peak.

In FIG. 4 the circuit 12 includes a transistor 53 under test. Transistor 53 is arranged in a common emitter configuration and is normally biased Off by battery 56 connected in the base-emitter circuit thereof. Battery 56 does not influence switch circuit 27 because its terminal voltage is inadequate to bias diodes 49 through 51 On in the absence of a drive pulse produced by circuit 27.

The application of a negative-going pulse from lead 52 to the base electrode of transistor 53 tends to bias this transistor into conduction. After the usual delay time, perceptible conduction begins, and a positive-going potential appears at the collector electrode of transistor 53 and is coupled through a capacitor 57 to a voltage peak detecting circuit 58.

It has been found that if transistor 53 is not driven into full conduction, the elapsed time from the moment of the application of the drive pulse until the occurrence of the peak output voltage for the partial switching operation is equal to the duration of the drive pulse applied to the transistor. Accordingly, transistor 53 may be made to operate through any desired fraction of its full operating transient by manipulating switches 37, 38, 43, and 44 to change the duration of the drive pulse. A direct digital readout of the time required to attain a particular transient peak is directly available from the dials of those switches.

Circuit 58 is a voltage peak-responsive circuit and includes a battery 59, a resistor 60, a diode 61, and a capacitor 62 connected in series in a loop circuit, with the terminal common to capacitor 62 and battery 59 being grounded. Positive-going potentials coupled through capacitor 57 and diode 61 are accumulated on capacitor 62, which is also connected in a bridge measuring circuit including resistors 63 and 64, as well as one of the reference batteries 65 or 66. Charges on capacitor 62 are retained for a relatively long time, as compared to the period of the driving pulse train supplied from multivibrator 10, by the high resistances of the back resistance of diode 61 and the bridge resistors 63 and 64.

Batteries 65 and 66 supply voltage equal to the 10 percent and 90 percent voltage points, respectively, in the turn-on switching transient for transistor 53 which is under test. A voltmeter 67 connected across one diagonal of the bridge by means of a shielded cable 68 and a ground lead 69 indicates unbalanced conditions in the bridge which are produced by a lack of equality between the voltage of the reference battery that is connected in the bridge and the peak voltage appearing across capacitor 62.

In order to accomplish a measurement of transistor delay time, i.e., the time required for the transistor output voltage to rise to 10 percent of its maximum voltage swing, the switch 70 is operated to connect battery 65 in the bridge measuring circuit. Battery 65 supplies a reference voltage $E_{td}$ equal to 10 percent of the full voltage swing at the collector electrode of transistor 53 if this transistor were driven into saturated conduction. Switch 37 in FIG. 3 is adjusted to insert in the circuit sections of coaxial cable as may be required to approximate the delay time of transistor 53.

Upon the application of pulses from oscillator 10, the indicator of meter 67 may swing either to the left or to the right indicating that transistor 53 is operating through a transient range which is either more or less than the initial 10 percent portion of its operating range. Switch 37 is again adjusted until meter 67 indicates that the peak output potential from transistor 53 is somewhat less than the reference potential $E_{td}$. Switch 38 is then operated to insert additional cable sections and increase the driving pulse duration in steps of one milli-microsecond until meter 67 indicates that the charge potential of capacitor 62 is almost equal to the voltage $E_{td}$ within the limits of adjustment of pulse width changer 11. The time required for transistor 53 to switch to its 10 percent point, i.e., the transistor delay time, may be read directly from the calibrated dials of the tens switch 37 and the ones switch 38.

Transistor 28 may remain in its conducting condition under the influence of the pulse from oscillator 10 long after changer 11 has been discharged. However, since resistor 29 is much smaller than resistor 32, the output potential developed is relatively small. One purpose of clipping diodes 49 through 51 is to remove such small potential excursions at the base of the driving pulses.

Additional cable sections may be added by operating switch 42 in order to extend the measurement to include transistor rise time. Switch 70 is operated to connect battery 66 in the bridge circuit so that the reference voltage is now $E_{tr}$ which represents the output voltage of transistor 53 at its transient 90 percent point. The balancing operation is again repeated, but this time the tens switch 43 and the ones switch 44 are operated, in the manner previously described for switches 37 and 38, to secure the balance. Switches 37 and 38 are not changed from their previously fixed positions. In the balance condition it is known that the turn-on time, delay time plus rise time, of transistor 53 is equal to the round trip propagation time of the total effective length of cable in changer 11. Delay time has already been fixed by the operation of switches 37 and 38 as previously described. Therefore, the additional transistor operating time due to the insertion of cable sections connected through switch 42 is the rise time which is sought, i.e., the time required for transistor 53 to change its operating condition from the 10 percent On condition to the 90 percent On condition. Rise time corresponds exactly to the time indicated on the calibrated dials of the selector switches 43 and 44.

Transistor rise time is known to be influenced by the effective amplitude of the drive pulse applied thereto. Some difficulty may, therefore, be encountered in making precise measurements since the transistor input circuit potential difference changes during its turn-on transient interval thereby changing the effective drive. Further in accordance with the invention, however, cable sections 47' and 48 and the additional sections controlled by switches 43 and 44 have a different characteristic impedance from the impedance of the remainder of the cable in width changer 11. This difference alters the resistance ratio of resistor 29 and the resistance of the cable in width changer 11 so that the drive pulse amplitude changes. When the two cable portions separated by switch 42 have different characteristic impedances, each drive pulse applied to transistor 53 includes an amplitude step at an intermediate point thereon corresponding to the 10 percent point of the switching transient. This amplitude step changes the magnitude of the transistor drive current in a direction which tends to offset the rise time variation that would otherwise occur as the transistor input circuit potential difference changes. A resistor 46 may be added to the changer 11 in series with cable section 47' in order to change the magnitude of the voltage step to suit a particular transistor under test.

In some applications it may be found that the different characteristic impedances which produce the desired amplitude step may also produce a smaller reflected step which forms a back porch on the end of the desired drive pulse. The reflected step may in some circuits prevent transistor 53 from turning Off immediately upon the termination of the main portion of the drive pulse. Clipping diodes 49, 50, and 51 also remove these amplitude variations due to reflections. Diodes must have rapid switching characteristics so that they may not change the shape of the driving pulses. Silicon high speed switching diodes have been found to be satisfactory for this purpose. The number of diodes used will be governed by the magnitude of the amplitude variations which must be clipped.

Transistor turn-off times, i.e., storage time and fall time, may also be measured by utilizing the described principles of the invention. Assuming the same transistor 53 and a similar test circuit 12', illustrated in FIG. 4A, it is necessary for this purpose to hold transistor 53 normally in conduction and to apply a short duration drive pulse which biases transistor 53 partially Off. The peak voltages to be detected are now negative-going and require obvious changes in polarity-sensitive devices as indicated by primed reference characters in FIG. 4A.

Drive pulses for measuring turn-off times are positive-going and may be provided by replacing the portion of transistor switch circuit 27 to the right of the broken line A—A in FIG. 2 by the switch circuit 27' in FIG. 2A. Circuit 27' is essentially similar to circuit 27 with collector and emitter circuit elements interchanged so that positive-going pulses are now produced in the collector circuit in response to switch action and coupled therefrom over lead 52' to the test circuit 12' in FIG. 4A. In addition, a battery 34 is added in series between resistor 29' and ground both for completing the collector circuit of transistor 28 and for setting the proper on state voltage level at the input to test circuit 12'. Battery 56' and its associated resistor in circuit 12' are no longer required, but they need not be removed because the resistance of the resistor is relatively high compared to resistor 29' so battery 56' is ineffective.

Clipping diodes 49 through 51 may be omitted in FIG. 2A because battery 34 reduces the effect of the difference between collector voltage with transistor 28 Off and collector voltage after a drive pulse, but while transistor 28 is still On, to a much smaller percentage of the latter. Likewise, relatively small amplitude excursions at the base of the drive pulse, as may be caused by impedance mismatches, are now relatively so small that they are negligible.

In order to measure turn-off times, the circuits of FIGS. 2A and 4A are substituted for their counterparts in FIGS. 2 and 4 by any convenient change of connections or by switching means. Transistor 53 in FIG. 4A conducts in the absence of drive pulses because battery 34 is now normally providing conducting bias. Positive drive pulses on lead 52' switch transistor 53 partially Off producing negative-going pulses at its collector. Circuit 58' responds to the peak negative voltages. The latter voltages are compared with the reference voltages to produce an indication on meter 67 as before.

Coaxial cable is generally insensitive to the range of operating temperature variations normally encountered in production test locations. Accordingly, the repeatability of measurements made with the described circuits is dependent upon only the ambient temperature effects on other circuit elements and upon the readability of voltmeter 67. The temperature factor has minor, almost negligible, effect. The readability factor is also minor since the meter dial can be readily calibrated to indicate balance with respect to desired reference voltages and to provide a vernier time indication wherein one scale division represents a time increment such as 0.2 millimicrosecond. With these factors so fixed any given measurement may be readily repeated.

Accuracy of measurement with the invention is largely a function of the accuracy with which cable sections can be cut to certain lengths to provide the desired time steps for adjusting drive pulse duration. It has been found to be relatively easy to accomplish such cutting so that time measurement accuracies representing substantial improvement over the prior art are readily attainable as previously outlined. Such improvement is sufficient to make it highly advantageous for both manufacturers and users of transistors to test transistors, as well as circuits including transistors, in accordance with this invention rather than with current oscilloscope techniques, when characterizing transistors in terms of such factors as delay time and rise time and storage and fall times. Similar advantages accrue in connection with the measurement of other switching type circuits.

Since the essentials of the testing method described herein include the application of a drive pulse of known duration and amplitude to a test circuit that produces a peak output voltage at an instant having a known relationship with respect to the end of the drive pulse, any time intervals that can be defined by operation responsive to such a pulse for producing such a peak can be measured with the described circuits.

Although this invention has been described in connection with a particular embodiment thereof, it is to be understood that additional embodiments and applications which will be obvious to those skilled in the art are included within the spirit and scope thereof.

What is claimed is:

1. A time-interval measuring set comprising a device operable to define a time interval, an oscillator, a calibrated variable pulse width changer connected to the output of said oscillator for generating pulses of a variable duration which is shorter than the total operating time of said device, means applying said pulses to operate said device through a portion of its full operating function, means applying operating potential to said device for producing a varying output voltage therefrom in response to the operation thereof, and means detecting the maximum excursion of said output voltage.

2. The time-interval measuring set in accordance with claim 1 in which said pulse width changer comprises a plurality of coaxial cable sections of different lengths, switch means selectively connecting at least one section of said cable in said changer, and means connecting said oscillator to said cable and responsive to pulses from said oscillator for charging and discharging the inherent capacitance between the conductors of said cable.

3. In a time-interval measuring set for measuring the operating time of a switching device and including means applying pulses of calibrated variable width to operate said device, and means indicating the maximum output potential of said device, the improvement in said pulse applying means which comprises a multivibrator, an electronic switch circuit coupled to the output of said multivibrator, chargeable calibrated delay means, means connecting said delay means to be charged and discharged in response to the operation of said switch circuit for producing drive pulses, and means applying said drive pulses to operate said device.

4. The time-interval measuring set in accordance with claim 3 in which said multivibrator has an output circuit including a voltage reference lead and a voltage varying lead, said electronic switch has an input circuit including a voltage reference lead and a voltage varying lead, and a transformer couples said switch to said multivibrator, said transformer comprising a single length of coaxial cable wound on a ferrite toroid, and each conductor of said single length of coaxial cable cross-connects a reference lead associated with one of said varying leads to a varying lead associated with the other reference lead.

5. The time-interval measuring set in accordance with claim 3 in which said calibrated delay means comprises a plurality of sections of coaxial cable of known characteristic impedance and of different known lengths, and means selectively connecting different ones of said cable sections in series to produce drive pulses of different known durations.

6. The time-interval measuring set in accordance with claim 5 in which a first portion of said cable sections has a first characteristic impedance, a second portion of said cable sections has a second characteristic impedance, and said selective connecting means is adapted for selectively connecting one or more sections of cable with said second characteristic impedance in series with one or more sections of said cable with said first characteristic impedance whereby said series connection of cable sections of different characteristic impedances produce an amplitude step at an intermediate point in each of said drive pulses.

7. The time-interval measuring set in accordance with claim 6 in which a resistor is arranged to be connected in series between said cable portions of different characteristic impedances for controlling the magnitude of said amplitude step in said drive pulses.

8. The time-interval measuring set in accordance with claim 6 in which said means connecting said cable means to be charged and discharged by said switch circuit includes a potential source of sufficient terminal voltage to charge said cable sections to a much larger voltage than is required for operation of said set, and a limiter circuit connected in shunt with respect to the input end of said series combination of said cable sections for limiting the maximum charge potential on said cable sections to the maximum value required for operation of said set.

9. The electric circuit combination for measuring the duration of part of the operating interval of a switching device, said combination comprising a coaxial cable transmission line of calibrated, adjustable length and characteristic impedance, a load resistor, means charging the distributed capacity of said coaxial cable, means cyclically discharging said cable through said load resistor thereby producing drive voltage pulses of known duration less than said operating interval, means applying said pulses to operate said device, and means indicating the peak output potential from said device.

10. The measuring circuit combination in accordance with claim 9 in which said coaxial cable comprises a first plurality of cable sections of different lengths corresponding to different unit propagation times, a second plurality of cable sections of different known lengths corresponding to different tens propagation time, and switching means for connecting in series one unit section and one tens section.

11. The measuring circuit combination in accordance with claim 10 in which a first portion of each of said units and tens sections has a first characteristic impedance and a second portion of each of said units and tens sections has a second characteristic impedance, said switching means being adapted to connect in a single series circuit one unit section and one ten section of said first characteristic impedance and one unit and one ten section of said second characteristic impedance for producing an amplitude step at an intermediate time in the duration of each of said drive pulses.

12. The measuring circuit combination in accordance with claim 11 in which a variable resistor is connected in series between said cable sections of said first and said second characteristic impedances for changing the magnitude of said step.

13. The measuring circuit combination in accordance with claim 12 in which said means applying drive pulses to operate said device includes means clipping from the output voltage wave including said output pulses, any potential excursions therein representing reflections from said cable of said amplitude step.

14. The measuring circuit combination in accordance with claim 9 in which a limiter shunts the input to said coaxial cable transmission line for fixing the maximum amplitude of said output pulses and thereby increasing the maximum operating frequency of said measuring circuit.

15. The measuring circuit combination in accordance with claim 9 in which said means applying pulses to operate said device includes means clipping the low amplitude base portions of said output voltage pulses.

16. A time-interval measuring circuit comprising an ungrounded transistor multivibrator producing an output pulse with a leading edge rise time which is much smaller than the smallest time interval to be measured, said multivibrator having a reference output terminal and a voltage varying output terminal, a pulse inverter comprising a coaxial cable section wound on a ferrite toroid, a transistor switch, a direct-current restorer connected between the output of said inverter and the input of said switch, said restorer having a reference input terminal and a voltage varying input terminal, the conductors of said inverter cable cross-connecting said voltage varying terminals to said reference terminals thereby coupling said multivibrator output pulse to said restorer with reversed polarity for actuating said transistor switch On and Off, said transistor switch comprising a transistor of the same conductivity type as the transistors in said multivibrator, means connecting said switch in an emitter follower configuration and including a load resistor connected between the emitter electrode thereof and ground, said emitter follower circuit further including a potential source connected between the collector electrode of said transistor switch and ground, means connecting the output of said restorer between said base and emitter electrodes but excluding said load resistor, an open circuited coaxial cable of adjustable length and characteristic impedance, said cable comprising plural units and tens sections of a first characteristic impedance, switching means connecting in a series circuit one unit and one ten section, plural units and tens sections of a second characteristic impedance, additional switching means connecting in a series circuit one unit and one ten section of said second characteristic impedance, further switching means connecting said two series circuits in a series combination circuit, a resistor connected in said series combination circuit between the cable sections of different characteristic impedance and having a resistance selected to reduce the difference between said characteristic impedances, means connecting the center conductor of said coaxial cable series combination circuit to the collector electrode of said transistor switch and connecting the outer conductor thereof to ground whereby the inherent capacitance of said cable is charged from said potential source when said switch is Off and discharged through said load resistor when said switch is On, a transistor under test connected in a common emitter configuration, at least one diode connected in series between said load resistor and the base electrode of said test transistor, said diode being poled for forward conduction of said drive pulses when a potential in excess of a predetermined magnitude is applied thereto, a voltage peak detecting circuit connected to the output of said transistor under test, a reference voltage source, a voltage comparator having said reference source and said detecting circuit output connected to the inputs thereof, and a meter connected to be actuated by said comparator output, said meter being adapted for zero center scale operation and calibrated in terms of time thereby providing a vernier indication of time represented by cable sections connected by said cable section switching means.

17. In an arrangement for measuring the elapsed time between the application of drive to an operable device and the attainment of a predetermined output voltage level from said device, said device being characterized in that its output voltage attains a peak value at a time having a known relationship with respect to the applied drive, said arrangement comprising a source of pulses of precisely measured duration, means applying said pulses to actuate said operable device, means connected to the output of said device for indicating the peak value of said output voltage, and calibrated means adjusting the duration of said pulses to produce a desired peak output from said operable device.

18. A test set for measuring the switching time of a transistor, said set comprising a transistor under test, a source of pulses, a switching transistor having first, second, and third electrodes, means applying pulses from said source between said first and second electrodes for actuating said switching transistor, a source of operating potential, a first resistor connected in series with said potential source between a reference potential terminal and one of said second and third electrodes, a second resistor connected between said terminal and the other of said second and third electrodes, said second resistor having a much smaller resistance than said first resistor, chargeable delay means connected to be charged and discharged in response to the actuations of said switching transistor for producing voltage pulses at a terminal of said second resistor remote from said reference terminal, means applying the last-mentioned pulses to said transistor under test for partially switching the same, and means measuring the output of said transistor under test.

19. The test set in accordance with claim 18 in which said first, second, and third electrodes are base, emitter, and collector electrodes, respectively said first resistor is connected to said emitter electrode, and a further source of potential is connected in series with said second resistor for supplying bias current to said transistor under test.

20. The test set in accordance with claim 18 in which a further source of potential is connected in series with said second resistor between said terminal and said other electrode for supplying bias current to said transistor under test.

References Cited in the file of this patent
UNITED STATES PATENTS 3,007,113  Kreinberg _____ Oct. 31, 1961